United States Patent Office 2,982,784
Patented May 2, 1961

2,982,784

PREPARATION OF HIGH MOLECULAR UNSATURATED ALDEHYDES

Richard A. Reck and Ralph P. Arthur, Chicago, Ill., assignors, by mesne assignments, to Armour & Company of Delaware, Chicago, Ill., a corporation of Delaware No Drawing. Filed Oct. 21, 1958, Ser. No. 768,556

2 Claims. (Cl. 260—601)

This invention relates to the preparation of high molecular unsaturated aldehydes, and more particularly to the aldol condensation of fatty aldehydes and dehydration of the resulting aldol to produce the high molecular unsaturated aldehydes.

There are very serious difficulties inherent in the known methods for producing high molecular weight aldehydes. These difficulties flow from the great reactivity of the aldehyde itself. Aldehydes are very easily and rapidly polymerized. They enter into many addition and condensation reactions. They are themselves reducing agents and are very easily oxidized. Because of this reactivity their preparation is hindered by the many competing reactions. Low yields are usually encountered and difficulty is also common in the separation of the aldehyde from the reaction mixture.

It is an object of this invention to provide an aldol condensation which is applicable to fatty aldehydes. A further object is to provide a method for preparing high molecular unsaturated aldehydes in which aldol condensation and dehydration of the resulting aldol are carried out in a single operation. A further object is to provide an aldol condensation applicable to fatty aldehydes in which competing reactions are minimized, and in which the preparation of a high molecular unsaturated aldehyde can be obtained in an efficient operation. Other objects and advantages will be apparent as the specification proceeds.

In accordance with this invention, high molecular unsaturated aldehydes are obtained by aldol condensation and dehydration of the resulting aldol in an operation which involves condensing a substantially anhydrous fatty aldehyde containing from 6 to 22 carbon atoms and at least one activated alpha hydrogen to form the corresponding aldol in the presence of a metal salt of a fatty acid containing from 6 to 22 carbon atoms in which the metal has an atomic number of from 24 to 29 while continuously separating from the reaction mixture at least a portion of the water of reaction.

Although the preparation of the high molecular unsaturated aldehyde is obtained in a single operation in accordance with this invention, there are involved two reactions which may be diagramed as follows:

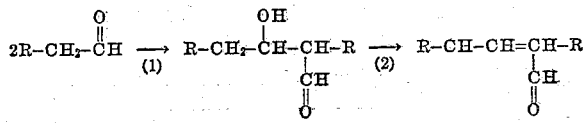

wherein (1) represents the aldol condensation reaction, and wherein (2) represents the dehydration of the aldol.

The aldehydes to which this process is applicable, namely fatty aldehydes containing from 6 to 22 carbon atoms, are substantially insoluble in water, and consequently the conventional aldol condensation reactions involving aqueous systems are unsatisfactory. Moreover, the fatty aldehyde employed in this process should be substantially anhydrous. Although any fatty aldehyde containing from 6 to 22 carbon atoms may be employed in this process, better results are to be obtained with fatty aldehydes containing from 8 to 18 carbon atoms. The characterization of this fatty acid as containing at least one activated alpha hydrogen refers to an activated hydrogen atom attached to the carbon adjacent to the carbonyl group thereof. In addition, it has been found that mixtures of fatty aldehydes of the aforementioned character may be employed in this process to obtain a multiplicity of condensation products.

The metal salt of a fatty acid containing from 6 to 22 carbon atoms is employed in this process as a catalyst. The metal included in this soap should have an atomic number of 24 to 29, and consequently such metal may be chromium, manganese, iron, cobalt, nickel or copper. It has been found that metal salts of this character are soluble in the fatty aldehyde. Although it is desirable to employ in the process a metal salt in which the fatty anion contains a number of carbon atoms similar to that of the fatty aldehyde, fatty anions differing from the fatty aldehyde in the number of carbon atoms contained therein may be utilized. Furthermore, although any of the foregoing metal salts may be employed as catalysts in this process, especially desirable results may be obtained with iron and copper stearate or caprylate. The metal ion concentration employed in the reaction mixture may be from 10 to 200 parts per million, but somewhat higher and lower concentrations have been found to be effective.

In carrying out this process the fatty aldehyde and catalysts may be combined in a distillation apparatus. The resulting solution may be heated at refluxed temperature to obtain condensation of two moles of the fatty aldehyde to form the corresponding aldol. Concurrently, there is obtained dehydration of the resulting aldol to form the corresponding unsaturated aldehyde. Continuous separation of the water of reaction from the reaction mixture by the distillation apparatus serves to shift the reaction equilibrium in the direction of completion, and at the same time maintains the reaction under substantially anhydrous conditions. After the reaction has been substantially completed, any remaining fatty aldehyde may be separated from the unsaturated aldehyde reaction product by fractional distillation without the necessity of removing the reaction mixture from the distillation apparatus.

This process is further illustrated by the following specific examples:

Example I

In a 200 ml. round-bottom flask were placed 72 gm. (0.5 mole) of decanal and 0.2 gm. of iron stearate. The mixture was heated at 110–115° C. and 15 mm. pressure for two hours. The water of reaction is removed by distillation as the reaction proceeds. The reaction mixture was then distilled at 1 mm. pressure. After approximately 28% of decanal is removed, the main fraction, boiling at 170–172° C. at 1 mm. Hg pressure, and amounting to 70% of the theoretical amount of 2-octyl-2-dodecenal, is collected.

Example II

One mole (128 gm.) of octanal containing 200 p.p.m. of cobalt catalyst was placed in a round-bottom flask. The cobalt was introduced as the fatty acid soap, cobalt stearate. The mixture was heated under reflux for 8 hours at approximately 130° C. and 15 mm. pressure. The water of reaction was removed by distillation as the reaction proceeded. The reaction mixture was separated by distillation under reduced pressure, 22 grams of the starting material, octanal, being first removed, then 85 gms. of the product 2-hexyl-2-decenal. This was 75% of theoretical yield.

Example III

One mole (128 gms.) of octanal containing 200 p.p.m. of manganese catalyst was placed in a round-bottom flask. The manganese was introduced as a fatty acid soap, manganese caprylate. The mixture was heated under reflux for 8 hours at approximately 130° C. and 15 mm. pressure. The water of reaction was removed by distillation as the reaction proceeded. The reaction mixture was separated by distillation under reduced pressure, 30 grams of the starting material, octanal, being first removed, then 72 grams of the product 2-hexyl-2-decenal. This was 70% of the theoretical yield.

Example IV

Sixty gms. of octadecanal containing approximately 200 p.p.m. of cobalt catalyst was placed in a round-bottom flask. The cobalt was introduced as a fatty acid soap, cobalt stearate. The mixture was heated under reflux for 16 hours at approximately 135° C. at 9 mm. pressure. The water of reaction was removed by distillation as the reaction proceeded. The reaction mixture was separated by distillation under reduced pressure. By analysis the crude produce was found to contain 81% of the theoretical yield of 2-hexadecyl-2-eicosenal.

Example V

Mixed dehydrated aldol condensation products may be obtained by the following procedure:

Substantially anhydrous octanal, in the amount of 64 gms. (0.5 mole), and substantially anhydrous dodecenal, in the amount of 92 gms. (0.5 mole), were introduced into a 300 ml. distilling flask. Also, 1 gm. of iron stearate was introduced into the flask. The flask was then placed on a Vigreaux still. The pressure in the flask was adjusted to 90 mm. of Hg, and the reaction mixture was refluxed for a period of four hours, i.e. temperature of 130–150° C. Water was removed from the flask by continuous distillation during the reaction.

Thereafter, the pressure in the flask was reduced to 9 mm. of Hg, and the reaction mixture was subjected to fractional distillation. Accordingly, three distillation fractions were obtained, and the distillation conditions and analysis of such fractions was, as follows:

| Fraction | Pressure and B.P. | Aldehyde (percent) | Weight (gms.) |
|---|---|---|---|
| I | 9 mm. Hg at 155–160° C | 97.3 | 34 |
| II | 2 mm. Hg at 165–175° C | 89.2 | 69 |
| III | 2 mm. Hg at 200–210° C | 88.3 | 31 |

It will be apparent from the foregoing analysis that the respective reaction products contained in these fractions may be described as follows:

(1) Fraction 1 contained the unsaturated aldehyde derived from the aldol condensation of two moles of octanal and dehydration of the resulting aldol, as follows:

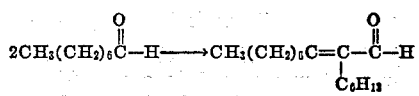

(2) Fraction 2 is a mixture of two dehydrated aldol condensation products, as follows:

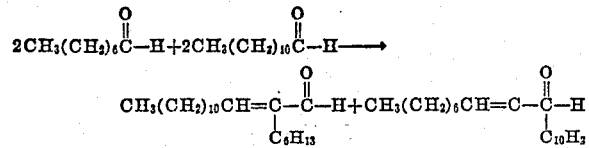

(3) Fraction 3 contain the product obtained by the aldol condensation of two moles of dodecenal and dehydration of the resulting aldol, as follows:

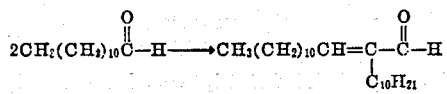

Instead of the iron, cobalt and manganese soaps employed in the foregoing examples, nickel, chromium and copper salts may be substituted as catalysts in this process.

Also, this catalyst may contain any fatty anion having from 6 to 22 carbon atoms and at least one activated alpha hydrogen.

Instead of the fatty aldehydes specified in the examples, this process is applicable to the aldol condensation and dehydration of any aldehyde containing from 6 to 22 carbon atoms to form the corresponding high molecular unsaturated aldehydes.

This is a continuation-in-part of our U.S. patent application Serial No. 582,947, filed May 7, 1956, and now abandoned.

While in the foregoing specification this invention has been described in considerable detail for the purpose of illustration, it will be apparent to those skilled in the art that many of these details can be varied widely without departing from the basic concept and spirit of the invention.

We claim:

1. In a process for preparing high molecular unsaturated aldehydes, wherein there is obtained aldol condensation and dehydration of the resulting aldol, the step of condensing a substantially anhydrous fatty aldehyde containing from 6 to 22 carbon atoms and at least one activated alpha hydrogen to form the corresponding aldol in the presence of a metal salt of a fatty acid containing from 6 to 22 carbon atoms in which the metal has an atomic number of from 24 to 29 while refluxing the reaction mixture under substantially anhydrous conditions and continuously separating from the reaction mixture substantially all of the water of reaction.

2. In a process for preparing high moleculer unsaturated aldehydes, wherein there is obtained aldol condensation and dehydration of the resulting aldol, the steps of forming a solution of at least one metal salt of a fatty acid containing from 6 to 22 carbon atoms in which the metal has an atomic number of from 24 to 29 in at least one fatty aldehyde containing from 6 to 22 carbon atoms and at least one activated alpha hydrogen, refluxing said solution under substantially anhydrous conditions and continuously separating therefrom the water of reaction to obtain the corresponding high molecular unsaturated aldehyde.

References Cited in the file of this patent

UNITED STATES PATENTS

| | | |
|---|---|---|
| 2,245,582 | Gallagher et al. | June 17, 1941 |
| 2,545,261 | Cole | Mar. 13, 1951 |
| 2,820,067 | Mertzweiller et al. | Jan. 14, 1958 |

FOREIGN PATENTS

| | | |
|---|---|---|
| 478,621 | Canada | Nov. 13, 1951 |